3,031,449
BASIC ESTERS OF TRIPHENYLETHYLENES
Robert E. Allen, Walnut Creek, Calif., Edwin R. Andrews, Cincinnati, Ohio, Edward L. Schumann, Kalamazoo, Mich., and Charles H. Tilford, Cincinnati, Ohio, assignors to Richardson-Merrell Inc., a corporation of Delaware
No Drawing. Filed July 18, 1958, Ser. No. 749,347
6 Claims. (Cl. 260—247.2)

This invention relates to new chemical compounds most of which are useful in the reduction of inflammation and edema, a number of which are useful as gonadotrophic inhibitors, and a number of which are uterotrophic.

The new compounds which reduce inflammation and edema are useful in the treatment of rheumatoid arthritis and other collagen diseases, gouty arthritis, neuralgia, bursitis, febrile states (including rheumatic fever), dermatosis, and conjunctivitis. The new gonadotrophic inhibitors are useful in the treatment of hyperplasia and hyperactivity of the gonads, sex-accessory organs, pituitary glands, and adrenal glands. The new uterotrophic compounds may be useful in functional uterine disorders.

The new compounds of this invention are basic esters of triphenylethylene of the structure

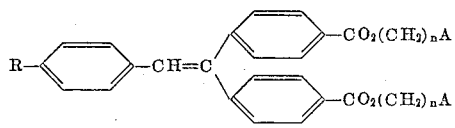

where R is hydrogen, methyl, lower alkoxy or fluoro, $n$ is an integer from two to four, and A is a secondary amino group which may be di(lower alkyl)amino or a cyclic amino group such as piperidino, morpholino, thiamorpholino or pyrrolidino.

The new compounds are basic and may be used as either the free bases or acid addition salts of these bases. These acid addition salts include the hydrochloride, hydrobromide, citrate, succinate, phosphate, sulfate, glycolate, acetate, tartrate, maleate and other pharmaceutically suitable salts. The new compounds can be administered orally in tablet or other suitable form, or parenterally, e.g., intravenously, or topically in an ointment.

The new compounds can be used orally in doses ranging from 25 mg. to 1.5 g. daily, parenterally in doses ranging from 0.1 mg. to 1 g. daily, and in ointments in a concentration of 1 to 10 percent. The preferred manner of administration is oral.

The new compounds of our invention may be prepared by the following scheme:

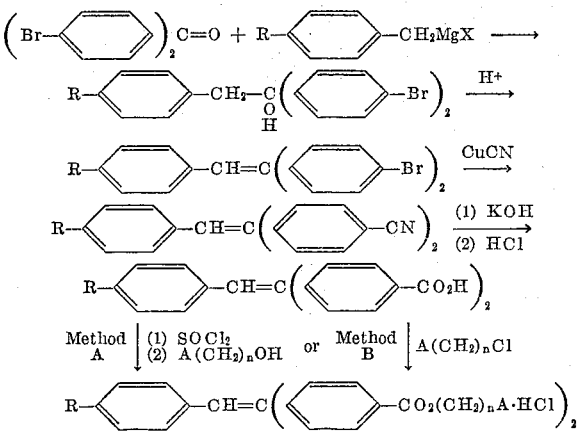

In the above scheme R may be hydrogen, methyl, lower alkoxy, or fluoro, $n$ is an integer from two to four, X is chloro or bromo, and A is a secondary amino group which may be di(lower alkyl) amino or a cyclic amino group such as piperidino, morpholino, thiamorpholino or pyrrolidino.

Examples 1 to 6 below illustrate the preparation of representative compounds of our invention. Examples 7 to 17 illustrate the preparation of representative phramaceutical formulations. It is to be understood, however, that these specific examples are for illustration only and are not to be construed as limiting the scope of the invention.

EXAMPLE 1

*1,1-Bis[p-(β-Dimethylaminoethoxycarbonyl)-Phenyl]-2-p-Methoxyphenylethylene*

A mixture of 50 g. of 1,1-bis(p-cyanophenyl)-2-p-methoxyphenylethylene in 500 ml. of isoamyl alcohol containing 65 g. of potassium hydroxide and 5 ml. of water was refluxed two and one-half hours and poured onto 500 g. of ice. The aqueous layer was acidified with 50 percent sulfuric acid, the precipitated product was washed with water, dissolved in a mixture of hot methanol and butanone, from which was obtained crystals of 1,1-bis-(p-carboxyphenyl)-2-p-methoxyphenylethylene, melting at 214–215° C. (after drying at 100°/0.5 mm.).

*Analysis.*—Calcd. for $C_{23}H_{18}O_5$: C, 73.78; H, 4.85. Found: C, 73.97; H, 4.91.

A mixture of 103 g. of 1,1-bis(p-carboxyphenyl)-2-p-methoxyphenylethylene and 230 g. of freshly-distilled thionyl chloride was allowed to stand at room temperature for a week then the mixture was diluted with 150 ml. of dry benzene and refluxed 30 minutes. When the solvent and excess thionyl chloride were removed, a solid residue formed which was recrystallized twice from dry benzene and ether to give 1,1-bis(p-chlorocarbonylphenyl)-2-p-methoxyphenylethylene, melting at 179–180° C.

To a solution of 8.6 g. of the bis acid chloride in 100 ml. of dry benzene was added a solution of 3.75 g. of β-dimethylaminoethanol in 15 ml. of dry benzene. After standing at room temperature for 16 hours and refluxing for an hour the solution was concentrated until crystallization commenced. With cooling, tan crystals separated which were washed successively with dry ether and hot acetone. The insoluble portion was recrystallized from ethanol-ethyl acetate to give white crystals of the dihydrochloride of 1,1-bis[p-(β-dimethylaminoethoxycarbonyl)phenyl]-2-p-methoxyphenylethylene, melting at 232° C. (with decomposition).

*Analysis.*—Calcd. for $C_{31}H_{36}N_2O_5 \cdot 2HCl$: C, 63.16; H, 6.50; N, 4.75. Found: C, 63.08; H, 6.75; N, 4.66.

This compound is orally active as an anti-inflammatory agent and is a gonadotrophic inhibitor.

EXAMPLE 2

*1,1-Bis[p-(β-Dimethylaminoethoxycarbonyl)-Phenyl]-2-Phenylethylene*

Following the procedure of Example 1, 1,1-bis(p-cyanophenyl)-2-phenylethylene was hydrolyzed to 1,1-bis (p-carboxyphenyl)-2-phenylethylene (crystallization from methanol-water), melting at 266–268° C.

*Analysis.*—Calcd. for $C_{22}H_{16}O_4$: C, 76.72; H, 4.68. Found: C, 76.11; H, 4.83.

A mixture of 15 g. of 1,1-bis(p-carboxyphenyl)-2-phenylethylene and 52 g. of thionyl chloride in 100 ml. of dry benzene was allowed to stand at room temperature overnight, then was refluxed five hours. Since some solid remained, 20 ml. of chloroform was added and the mixture was refluxed eight hours or until all solid was dissolved. The excess thionyl chloride and solvents were removed and the residue was dissolved in dry benzene and diluted with petroleum ether (75–90°). Crystals of 1,1- bis(p-chlorocarbonylphenyl)-2-phenylethylene were obtained, melting at 111–115° C. When the bis acid chloride was treated with β-dimethylaminoethanol as described in the procedure of Example 1, the dihydrochloride of 1,1 - bis[p - (β-dimethylaminoethoxycarbonyl)phenyl]-2-phenylethylene was obtained, melting at 195–198° C.

*Analysis.*—Calcd. for $C_{30}H_{34}N_2O_4 \cdot 2HCl \cdot H_2O$: C, 62.39; H, 6.63; N, 4.85. Found: C, 62.83; H, 6.71; N, 4.97.

This compound is anti-inflammatory and a gonadotrophic inhibitor.

EXAMPLE 3

1,1-Bis[p-(β-Dimethylaminoethoxycarbonyl)Phenyl]-2-p-Tolylethylene

To a solution of 68 g. of 4,4'-dibromobenzophenone in 400 ml. each of dry benzene and ether was added 760 ml. of an ethereal solution containing 0.3 mole of p-methylbenzylmagnesium bromide. After refluxing an hour, the mixture was decomposed with dilute acid, the ethereal solution was evaporated and the residue was stirred with 400 ml. of 85 percent phosphoric acid at about 100° C. for six hours. A chloroform solution of the mixture was washed with water, dried and the solvent was removed. The residue was crystallized from ethanol repeatedly to give crystals of 1,1-bis(p-bromophenyl)-2-p-tolylethylene, melting at 113–114° C. A mixture of 42.8 g. of this bromo compound and 29.9 g. of cuprous cyanide in 168 ml. of quinoline was refluxed five hours, then poured into 250 ml. of chilled concentrated hydrochloric acid. Five extracts of the reaction mixture with chloroform were combined, washed with concentrated hydrochloric acid, twice with water and the solvent was removed. The residue was crystallized twice from hot ethanol to give 1,1-bis(p-cyanophenyl)-2-p-tolylethylene, melting at 167–169° C. When this bis nitrile was hydrolyzed according to the procedure described in Example 1, 1,1-bis(p - carboxyphenyl) - 2 - p - tolylethylene was obtained (from methanol-water), melting at 244–246° C. Fourteen grams of this bis acid was refluxed with 46.5 g. of thionyl chloride in 50 ml. of dry benzene for six hours and the excess thionyl chloride and benzene were removed. The residue crystallized upon standing and melted at 173–174° C. This residue was treated with 7 g. of β-dimethylaminoethanol as described in the procedure of Example 1. The crude dihydrochloride salt obtained was dissolved in water and treated with a slight excess of 5 percent sodium bicarbonate solution. A benzene extract of the base was washed with water, dried, and the benzene was removed. To a butanone solution of the free base was added a butanone solution of 5.8 g. of maleic acid. When diluted with ether, a white solid precipitated. This was recrystallized from butanone and a small amount of methanol. The dimaleate salt of 1,1-bis[p - (β - dimethylaminoethoxycarbonyl)phenyl] - 2 - p-tolylethylene was obtained, decomposing at 120° C.

*Analysis.*—Calcd. for $C_{31}H_{36}N_2O_4 \cdot 2C_4H_4O_4$: C, 63.92; H, 6.05; N, 3.82. Found: C, 63.74; H, 6.42; N, 3.87.

This compound has anti-inflammatory activity.

EXAMPLE 4

1,1-Bis[p-(β-Dimethylaminoethoxycarbonyl)Phenyl]-2-p-Fluorophenylethylene

Following the procedure described in Example 3, using p-fluorobenzylmagnesium chloride in place of p-methylbenzylmagnesium bromide, the following intermediates were obtained: 1,1-bis(p-bromophenyl)-2-p-fluorophenylethylene (crystals from methanol), melting at 133–134° C.; 1,1 - bis - (p - cyanophenyl)-2-p-fluorophenylethylene (crystals from ethanol), melting at 189–191° C.; 1,1-bis(p-carboxyphenyl)-2-p-fluorophenylethylene (crystals from methanol-water), melting at 233–235° C.; 1,1-bis(p-chlorocarbonylphenyl)-2-p-fluorophenylethylene (crystals from benzene—low boiling petroleum ether), melting at 125–128° C. The oily product obtained after treating the bis acid chloride with β-dimethylaminoethanol was crystallized from acetonitrile and finally from isopropanol-ether to give 1,1 - bis[p - (β - dimethylaminoethoxycarbonyl)phenyl]-2-p-fluorophenylethylene as the dihydrochloride salt, melting at 200° C.

*Analysis.*—Calcd. for $C_{30}H_{33}N_2O_4F \cdot 2HCl \cdot H_2O$: C, 60.50; H, 6.26; N, 4.70. Found: C, 60.29; H, 6.46; N, 4.21.

This compound has anti-inflammatory activity.

EXAMPLE 5

1,1-Bis[p-(β-N-Morpholinoethoxycarbonyl)Phenyl]-2-p-Methoxyphenylethylene

When N-(β-hydroxyethyl)morpholine was substituted for β-dimethylaminoethanol in the procedure for Example 1, a hygroscopic dihydrochloride salt of the desired basic ester was obtained. This was converted to the free base in ether, using a 5 percent solution of sodium bicarbonate, the ether solution was dried and a two molar equivalent of oxalic acid in ether was added. The white solid which formed was recrystallized from hot methanol-butanone to which was added enough dry ether to produce cloudiness. Crystals of the oxalic acid salt of 1,1-bis[p(β - morpholinoethoxycarbonyl) phenyl]-2-p-methoxyphenylethylene were obtained, melting at 124–126° C.

*Analysis.*—Calcd. for $C_{35}H_{40}N_2O_7 \cdot 2C_2H_2O_4$: C, 59.99; H, 5.68; N, 3.59. Found: C, 60.11; H, 5.87; N, 3.56.

This compound has uterotrophic activity.

EXAMPLE 6

1,1-Bis[p-(β-Dimethylaminoethoxycarbonyl)Phenyl]-2-p-Methoxyphenylethylene

This compound was prepared by method B (col. 1). A solution of 18.7 g. of 1,1-bis(p-carboxyphenyl)-2-p-anisylethylene and 14.0 g. of freshly distilled 2-diethylaminoethyl chloride in 70 cc. of isopropanol was heated to reflux on a steam bath for fifteen hours. A small amount of white solid was removed by filtration and the isopropanol was evaporated from the filtrate under reduced pressure. The viscous residue was finally crystallized from boiling ethyl acetate. The solid obtained was recrystallized from a mixture of ethyl acetate and isopropanol to give the dihydrochloride salt of the desired 1,1-bis[ - p - (β - diethylaminoethoxycarbonyl)phenyl] - 2-p-methoxyphenylethylene, melting point 200–201° C. with sintering at 198° C.

This compound has anti-inflammatory activity.

*Analysis.*—Calcd. for $C_{35}H_{44}N_2O_5 \cdot 2HCl$: C, 65.10; H, 7.18; N, 4.34; Cl, 10.98. Found: C, 64.82; H, 7.58; N, 4.27; Cl, 10.93.

Other basic esters of triphenylethylene which are prepared by the procedures of the above examples include:

1,1 - bis[p - (β - thiamorpholinylethoxycarbonyl)phenyl] - 2-(p-fluorophenyl)ethylene dihydrochloride 1,1 - bis[p - (γ - piperidylpropoxycarbonyl)phenyl] - 2 - (p-methoxyphenyl)ethylene dihydrobromide 1,1 - bis[p - (δ - dipropylaminobutoxycarbonyl)phenyl] - 2-phenylethylene dihydrobromide 1,1 - bis[p - (β - pyrrolidylethoxycarbonyl)phenyl] - 2 - (p-fluorophenyl)ethylene dihydrochloride The following examples illustrate suitable pharmaceutical compositions containing the new compounds. In these examples the quantities are given for single units, it being understood that in actual practice the dosage forms will be prepared in suitable quantities and the amounts adjusted accordingly.

EXAMPLE 7

*Tablets, 25 mg.*—Twenty-five mg. of the dihydrochloride of 1,1 - bis[p - (β - dimethylaminoethoxycarbonyl)-phenyl]-2-p-methoxyphenylethylene (Example 1), 48 mg. of powdered sugar, and 32 mg. of corn starch are mixed and granulated with 10 percent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a 9/32 inch punch.

EXAMPLE 8

*Tablets, 500 mg.*—Five hundred mg. of the dihydrochloride of 1,1-bis-[p-($\beta$-dimethylaminoethoxycarbonyl)-phenyl]-2-p-methoxyphenylethylene (Example 1), in finely powdered form, is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary machine using a 7/16 inch punch.

The tablets of Examples 7 and 8 may be suitably coated if desired, as, for example, with sugar.

EXAMPLE 9

*Capsules, 25 mg.*—Twenty-five mg. of the dihydrochloride of 1,1 - bis[p - ($\beta$ - dimethylaminoethoxycarbonyl)-phenyl]-2-phenylethylene (Example 2) is admixed with corn starch in quantity required to provide sufficient bulk for the desired size capsule, and the mixture is encapsulated.

EXAMPLE 10

*Capsules, 500 mg.*—Five hundred mg. of the dihydrochloride of 1,1-bis-[p-($\beta$-dimethylaminoethoxycarbonyl)-phenyl]-2-phenylethylene (Example 2) is admixed with sufficient corn starch to give the proper bulk for the desired capsule, and the mixture is encapsulated.

EXAMPLE 11

*Injectable suspension, 100 mg. per ml.*—The following ingredients are sterilized separately: 100 mg. of the dihydrochloride of 1,1-bis[p-($\beta$-dimethylaminoethoxycarbonyl)phenyl]-2-p-methoxyphenylethylene (Example 1), 0.1 mg. of Tween 80 and q.s. corn oil to make a final volume of 1 ml. These ingredients are admixed aseptically. Particle size may be achieved by use of micronized material or by use of a ball mill, maintaining aseptic conditions. The above suspension may be administered subcutaneously and intramuscularly.

EXAMPLE 12

*Oral suspension, 700 mg. per 15 ml.*—One hundred fifty mg. of Veegum H.V. are hydrated in about 9 ml. of water; 500 mg. of Tween 80, 700 mg. of the dihydrochloride of 1,1-bis[p-($\beta$-dimethylaminoethoxycarbonyl)-phenyl]-2-phenylethylene (Example 2), color and flavor, as desired, and water q.s. 15 ml. are added; the product is mixed well and homogenized.

EXAMPLE 13

*Liquid (syrup), 25 mg. per teaspoon.*—Twenty-five mg. of the dihydrochloride of 1,1-bis[p-($\beta$-dimethylaminoethoxycarbonyl)phenyl]-2-phenylethylene (Example 2) is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor, as desired, and water q.s. are then added.

EXAMPLE 14

*Liquid (syrup), 500 mg. per tablespoon.*—Five hundred mg. of the dihydrochloride of 1,1-bis[p-($\beta$-dimethylaminoethoxycarbonyl)phenyl]-2-p-methoxyphenylethylene (Example 1) and 4.5 mg. of sugar are dissolved in sufficient water so that after the addition of 2.25 ml. of alcohol USP and flavor, as desired, the volume is 15 ml.

EXAMPLE 15

*Injectable solution, 25 mg. per ml.*—Twenty-five mg. of the dihydrochloride of 1,1-bis[p-($\beta$-dimethylaminoethoxycarbonyl)phenyl]-2-p-methoxyphenylethylene (Example 1) and water for injection q.s. one ml. are mixed and warmed gently till solution is accomplished. The solution is filtered through fine sintered glass, filled into sterile one ml. ampuls, and sterilized at 250° F. for 30 minutes.

EXAMPLE 16

*1% ointment.*—To a melt of 1.5 lbs. of propylene glycol, 6.68 lbs. of polyethylene glycol 400 USP and 6.68 lbs. of carbowax 4000 USP is added 0.15 lbs. of micropulverized 1,1 - bis[p - ($\beta$ - dimethylaminoethoxycarbonyl)phenyl] - 2 - p - methoxyphenylethylene (Example 1). The product is stirred until almost solid and milled if necessary to a smooth ointment. Fill in suitable containers.

EXAMPLE 17

*10% ointment.*—To a melt of 1.5 lbs. of propylene glycol, 6 lbs. of polyethylene glycol 400 USP and 6 lbs. carbowax 4000 USP is added 1.5 lbs. of micropulverized 1,1 - bis[p - ($\beta$ - dimethylaminoethoxycarbonyl)phenyl] - 2-phenylethylene (Example 2). The product is stirred until almost solid and milled if necessary to a smooth ointment. Fill in suitable containers.

We claim:

1. 1,1-bis p-($\beta$-dimethylaminoethoxycarbonyl)phenyl-2-(p-methoxyphenyl)ethylene.
2. 1,1-bis p-($\beta$-dimethylaminoethoxycarbonyl)phenyl-2-phenylethylene.
3. 1,1-bis p-($\beta$-dimethylaminoethoxycarbonyl)phenyl-2-(p-tolyl)ethylene.
4. 1,1-bis p-($\beta$-dimethylaminoethoxycarbonyl)phenyl-2-(p-fluorophenyl)ethylene.
5. 1,1 - bis p - ($\beta$ - N - morpholinylethoxycarbonyl)phenyl-2-(p-methoxyphenyl)ethylene.
6. A compound selected from the group consisting of compounds of the formula

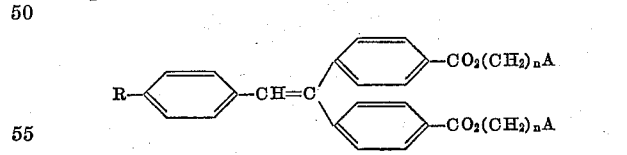

where R is selected from the group consisting of hydrogen, methyl, lower alkoxy and fluoro, $n$ is an integer from 2 to 4, and A is a secondary amino grouping selected from the group consisting of di(lower alkyl)amino, piperidino, morpholino, thiomorpholino and pyrrolidino and their acid addition salts.

No references cited.